United States Patent [19]

McGinnis et al.

[11] 3,810,243

[45] May 7, 1974

[54] SELECTIVELY TENSIONED TRANSDUCER ASSEMBLY FOR OPERATION IN COMPLIANT RELATION TO INDIVIDUAL MEMORY DISCS OF A PARTITIONABLE AGGREGATE OF ROTATING FLEXIBLE DISCS

[75] Inventors: Bernard W. McGinnis, Poughkeepsie; Anthony W. Orlando, Highland, both of N.Y.

[73] Assignee: International Business Machines Corporation, Armonk, N.Y.

[22] Filed: July 2, 1973

[21] Appl. No.: 375,986

[52] U.S. Cl. .......... 340/174.1 E
[51] Int. Cl. .......... G11b 5/60
[58] Field of Search .......... 346/137; 340/174.1 E; 179/100.2 P, 100.2 A

[56] References Cited

UNITED STATES PATENTS

| | | | |
|---|---|---|---|
| 3,703,713 | 11/1972 | Pohm et al. | 340/174.1 E |
| 3,618,055 | 11/1971 | Van Acker et al. | 340/174.1 E |
| 3,537,083 | 10/1970 | Voth | 340/174.1 E |
| 3,688,285 | 8/1972 | Lawrence et al. | 340/174.1 E |
| 3,729,720 | 4/1973 | Derling et al. | 340/174.1 E |
| 3,737,880 | 6/1973 | Kelly | 340/174.1 E |
| 3,151,319 | 9/1964 | Marrs | 340/174.1 E |
| 3,405,405 | 10/1968 | Boissevain et al. | 340/174.1 E |
| 3,179,945 | 4/1965 | Shapiro | 340/174.1 E |

*Primary Examiner*—Vincent P. Canney
*Attorney, Agent, or Firm*—Robert Lieber

[57] ABSTRACT

A resiliently suspended magnetic transducer (head) with distinctive convex contours is positioned to form a hydrodynamic bearing relative to the surfaces of randomly selected object discs in a continuously rotating laminar assembly of several hundred flexible discs. The normally contiguous discs are spread partially open by flexure at randomly selected interfaces. The head operates in the work space formed by such flexure. When the spring tension on the head suspension is suitably adjusted ("tuned") a hydrodynamically lubricated dimple intimately complementing the head contour forms in the rotational path of the object disc at head interface. The dimple displacement is generally greater than a disc thickness. A constant tension empirically determined enables the head to operate with satisfactory conformality and lubrication relative to all but a small number of end-positioned discs. By not using these end discs as working records the "TUNING* tension may be pre-adjusted and maintained at a constant level. Alternately, the tension could be dynamically "tuned" or servoed to permit effective working operation relative to the end discs.

4 Claims, 14 Drawing Figures

SELECTIVELY TENSIONED TRANSDUCER ASSEMBLY FOR OPERATION IN COMPLIANT RELATION TO INDIVIDUAL MEMORY DISCS OF A PARTITIONABLE AGGREGATE OF ROTATING FLEXIBLE DISCS

CROSS REFERENCES TO RELATED APPLICATIONS

1. Application Ser. No. 375,989 by R. A. Barbeau, B. W. McGinnis, A. W. Orlando and J. A. Weidenhammer entitled "Partitionable Disc Memory With Flexible Discs And Conformally Suspended Head."

BACKGROUND OF THE INVENTION

1. Field of the Invention

Multi-disc rotating memories for random access mass storage; wherein normally inaccessible recording surfaces of continually co-rotating cylindrically arrayed flexible magnetic discs are rendered accessible by deformation of the discs.

2. Prior Art and Summary of Invention

It is generally well known in the magnetic disc recording arts to position transducers in gliding or flying relation to randomly selected object disc surfaces within cylindrical array of self-supporting spaced discs. It is also known that thin flexible discs, in closely spaced continually rotating laminar formations, can be rendered randomly accessible by isolating the disc to which access is desired in an axially and radially transportable comb-like guide structure incorporating a rigidly suspended head (e.g., as disclosed in U. S. Pat. Nos. 3,509,553, 3,618,055, 3,703,713). In such single disc isolating configurations the object disc is vulnerable to stress exerted by the guide structure limiting the rotational speed (i.e., access time). It is also difficult to achieve finely tuned compliance or conformance between the head and the isolated object disc without hydrostatic assistance.

Lynott et al., *IBM Technical Disclosure Bulletin*, Volume 12, No. 1, June 1969, Page 81 indicates a laminar cylindrical configuration of co-rotating flexible discs characterized by independently suspended partitioning and transducing sub-assemblies and vertically oriented disc rotational axis. The uppermost disc is restrained to prevent upward deformation of the disc cylinder but the discs are displaceable downwardly. The partitioning mechanism operates to partially open the rotating cylinder by downward flexure applied at a randomly selected interface. This forms the work space for the head. The head is emplaced adjacent the disc segment rotating above the work space. Presumably the displaced and undisplaced disc segments acquire stable rotational orbits due to centrifugal forces. Ideally, the head would have gliding (i.e., air lubricated) and tightly compliant or conformal relation to the object disc surface.

The present invention concerns the unexpected discovery that in the type of flexible disc organization characterized by Lynott et al. the relationship between the head and object disc can be fine tuned to optimal air-lubricated compliant form by control of head contour and head tension relative to the object disc. By optimal form we refer to head to disc spacing which affords highest lineal recording density consistent with acceptable levels of disc wear and signal to noise record characteristics. Adjustment (tuning) of head tension need not be dynamically varied if a small segment of end-positioned discs is not accessed (e.g., 25 discs at the restrained end or 50 at the displaceable end of the cylindrical array). Conversely all end discs are useful if head tension is adapted for automatic dynamic tuning adjustment.

U. S. Pat. No. 3,130,393 to R. Gutterman discloses a cylindrical configuration of co-rotating discs which can be spread completely apart at random interfaces by operation of a movably positioned high pressure jet relative to the enclosed pistons formed by the discs on either side of the jet. A rigidly supported magnetic head is maneuvered by pneumatic mechanism into the work space formed by the jet and emplaced radially adjacent the surface of the virtually solid piston construction formed by the displaced segment of discs. Although the discs are not very thick they are not operated as compliant members. Hence the recording density advantages of compliant discs cannot be realized.

An object of the present invention is to operate multiple co-rotating compliant discs in finely tuned compliant relation to a common access head.

Tuning is accomplished by providing separate chassis for the partitioning mechanism and/or the head retaining assembly subject to adjustible positioning on a common positioning carriage movable over the axial length of the disc cylinder. Adjustment, e.g., of the position of the partitioning assembly relative to the head assembly, results in positional shift of the object disc work surface relative to the head assembly. This in turn modifies the tension exerted by the object disc on the emplaced head.

The foregoing and other features, objectives and characteristics of the subject invention will be more completely understood and appreciated from the following detailed description and claims.

DETAILED DESCRIPTION

Apparatus Configuration

Following is a description of apparatus embodying the subject invention with relevant details of construction and operation of the partitioning and stabilizing elements. Details of other elements not relevant to the operation of the subject invention, for instance particulars of disc locating disc partitioning and disc stabilizing elements are found in the above cross-referenced patent application and other applications referenced therein.

Referring to FIGS. 1–8 subject apparatus comprises co-rotating disc pack sub-assembly 2, stabilizing members 4*a*, 4*b* and 4*c* and access sub-assembly 6.

Disc Sub-Assembly

Figure 3:
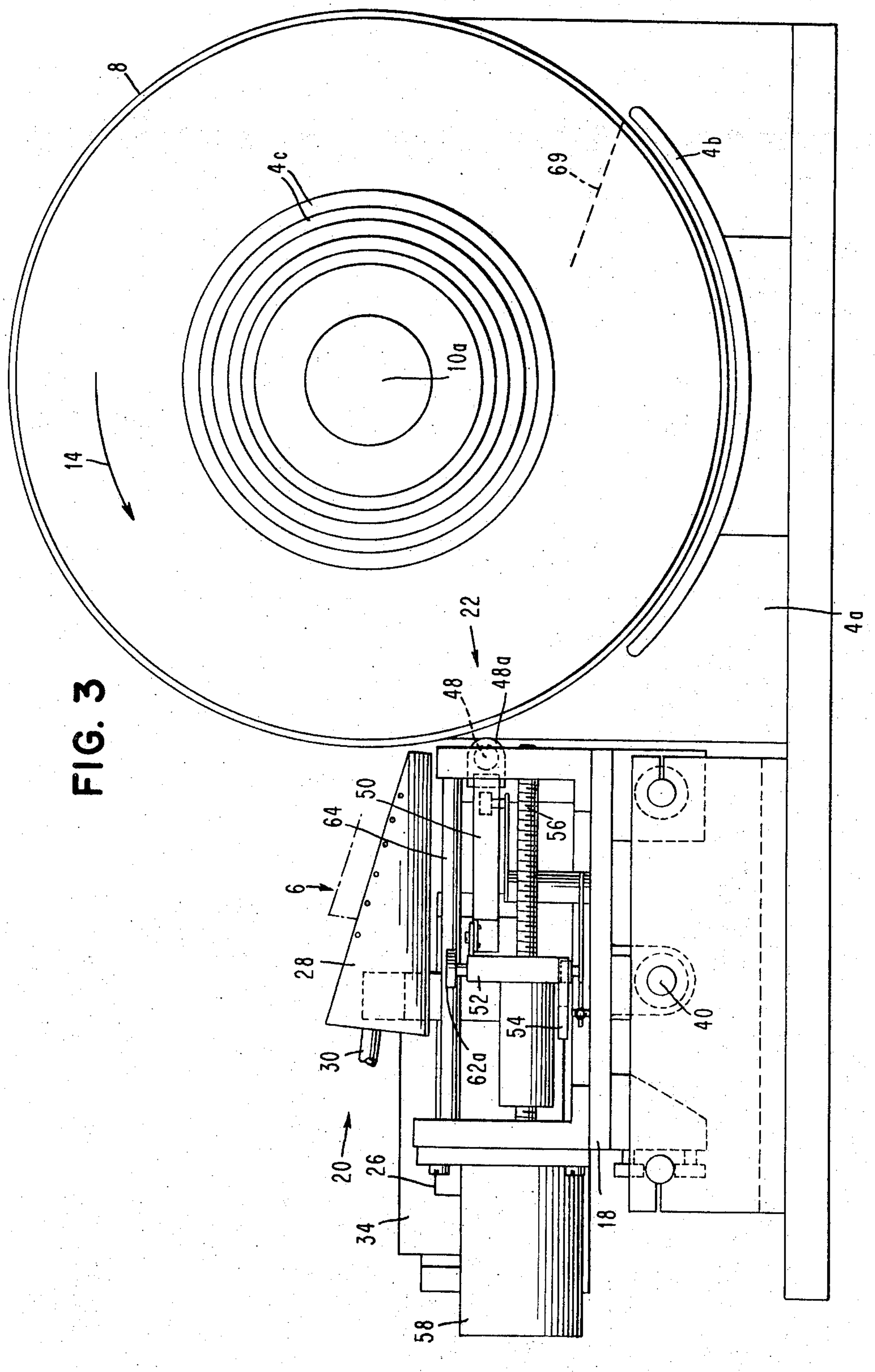
Figures 4, 5, 9:
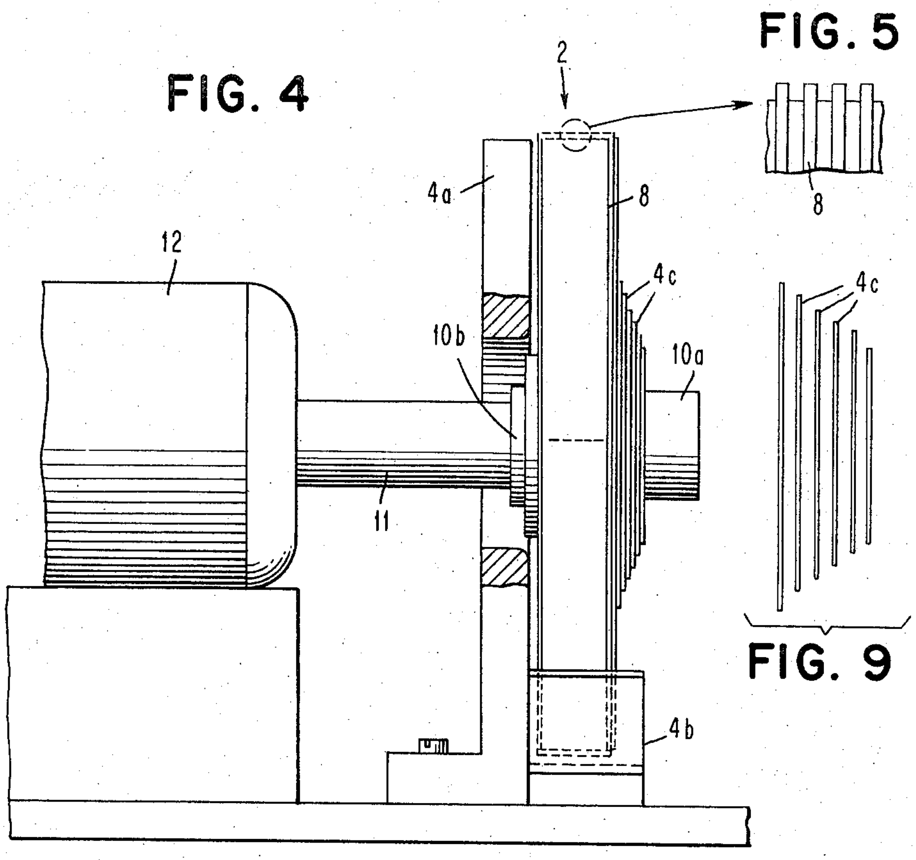
FIGS. 4, 5 and 9 illustrate the disc sub-assembly.
Figures 6, 7, 8:
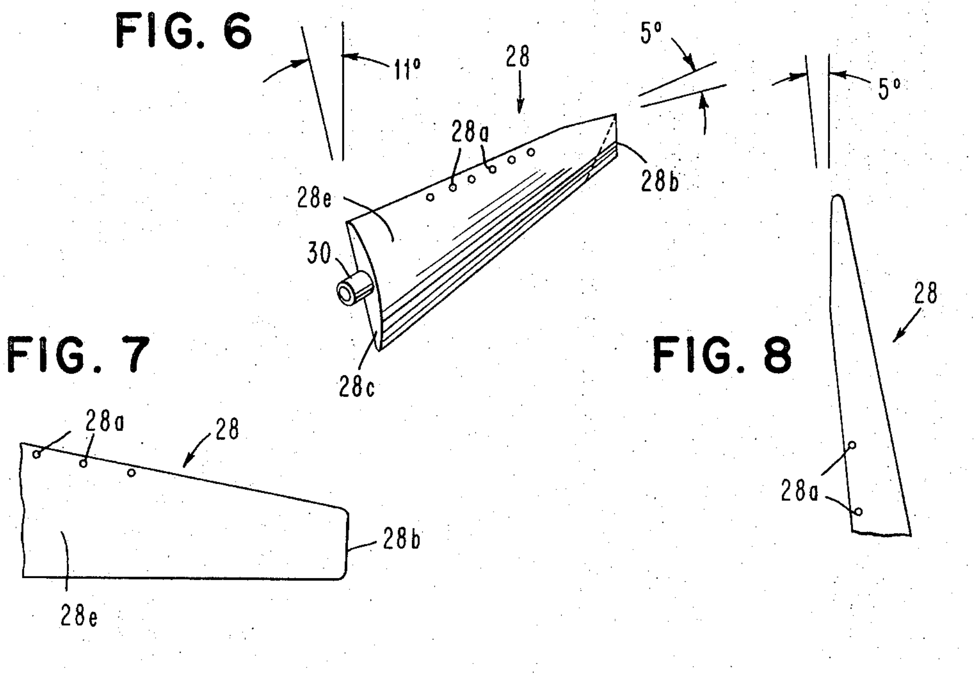
FIGS. 6–8 illustrate the partitioning blade.

Disc assembly 2 comprises several hundred ultra-thin (nominal thickness 0.0017 inches) flexible magnetic recording discs 8. Discs 8 are secured together by clamps 10*a*, 10*b* (FIG. 4) for co-rotation upon horizontal spindle 11 driven by motor 12 (FIG. 4). The discs have nominal diameters of 12 inches; alternate discs being shortened slightly to 11.7 inches diameter (FIG. 5) to provide for edge discrimination by not shown edge locating apparatus. The foils are cut from webs of magnetic oxide coated mylar (mylar thickness in inches approximately 0.0015; oxide coating thickness approximately 0.0002). The discs are rotated by motor 12 continuously at high speed (e.g. 1,800 rpm) in the direction indicated by arrow 14 (FIG. 3).

Access Sub-Assembly (FIGS. 1–3, 6–8)

Access sub-assembly 6 comprises carriage 18, partitioning sub-assembly 20, transducing sub-assembly 22 and a not shown edge locating sub-assembly. The edge locating sub-assembly forms no part of the present invention and may be either of conventional construction, as described in the prior art references cited above, or of specialized improved construction as described in a co-pending patent application by R. Cobb and J. Lipp Ser. No. 375,985.

Partitioning Sub-Assembly

Partitioning sub-assembly 20 comprises shaft 24 secured to chassis 25 which in turn is adjustably fastened to carriage 18. Carrier 26 slideable on shaft 24 rigidly supports air foil blade 28 for movement relative to interfaces of discs 8. Blade 28 comprises a hollow structure terminating in air passages 28*a* (FIGS. 6–8) and tubular conduit 30. Tube 30 is adapted to conduct air under slight pressure from a not shown source into partition (work) spaces between discs 8 formed by the blade. The purpose of this air is to provide disc stabilization effects discussed later. Carriage 18 is movable parallel to the axis of rotation of disc 8 by rotation of screw 40. Rotation of screw 40 is caused by not shown selectively coupled motive means. Blade carrier 26 is movable obliquely relative to chassis 25 and the disc rotational axis by operation of pneumatic assembly comprising piston rod 32 and pneumatic chamber 34. Admission of air under pressure to chamber 34 via supply tube 36 thrusts piston rod 32 smartly outward to extend blade 28 obliquely into contact with the rotating discs at the randomly selected disc interface determined by the position of carriage 18. This action forms a partial separation between the interfacing discs which serves as the work space for the transducing head assembly described below. Release of air from chamber 34 restores piston rod 32, under the influence of a not shown spring, to its retracted or home position in which the blade is removed from partitioning engagement with the discs and thereby free to move axially relative to the discs. In this position screw 40 is permitted to drive carriage 18, under control of the above-mentioned edge locating assembly, to position blade 28 relative to another randomly selected disc interface; whereupon the partitioning process may be repeated. The contours and motion of the blade, and the damping and stabilizing effects caused by stabilizing elements 4*a*, 4*b*, 4*c*, 28*a* as explained in the above cross-referenced application, cause the partitioned pack to assume aerodynamically stable rotational configurations very shortly after initial contact with the blade (e.g., $200 \times 10^{-3}$ seconds) despite its low mass.

Transducer Sub-Assembly (FIGS. 1–3, 11–13)

Sub-assembly 22 (FIGS. 1–3) comprises compound radius magnetic head assembly 48 suspended on arm 50 comprising dual cantilevered beam springs. Assembly 48 (FIG. 11) comprises magnetic pole pieces 44 encapsulated in non-magnetic ceramic; the pole pieces terminating in a non-magnetic gap. The remote ends of arm 50 are fastened via crosspiece 52 (FIG. 10) to carrier 54 which is translatably mounted on rotatable screw 56 (FIG. 2) carried on carriage 18. Rotation of screw 56 by step motor 58 imparts motion to carrier 54, arm 50 and head 48 perpendicular to the direction of movement of carriage 18 (i.e., toward the disc interface).

Figure 1:
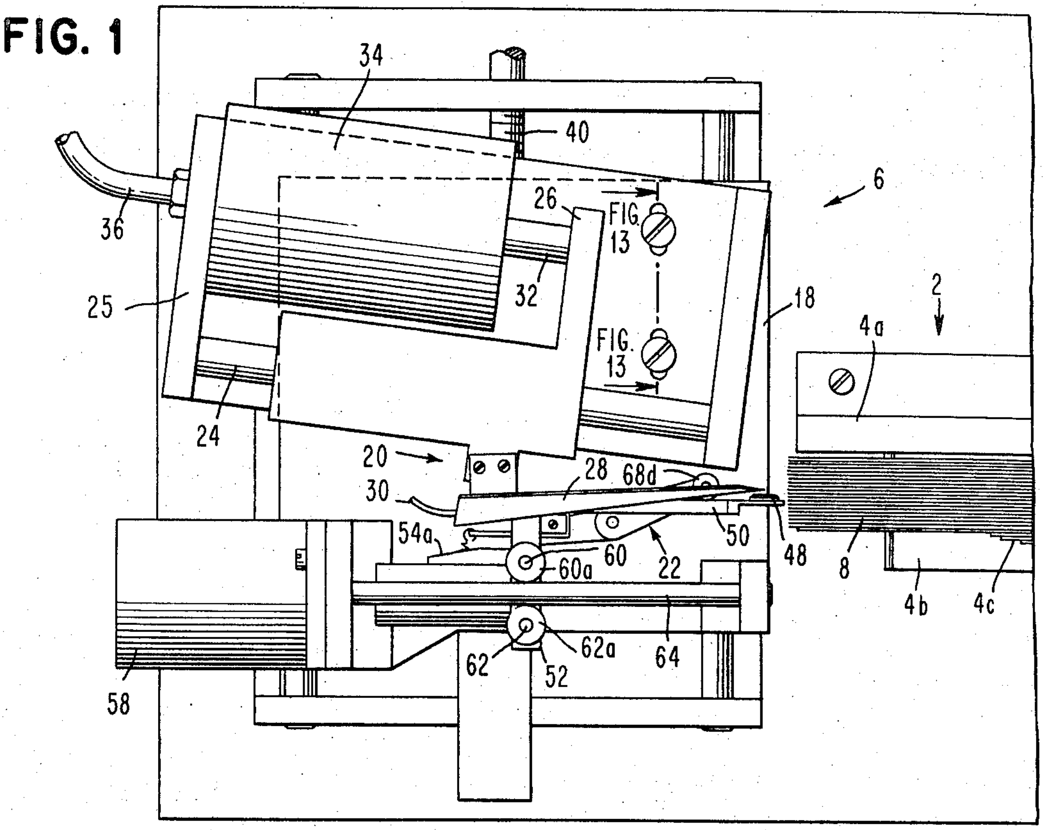
FIGS. 1–3 contain top, side and end elevational views of laminar disc apparatus incorporating subject invention.
Figure 2:
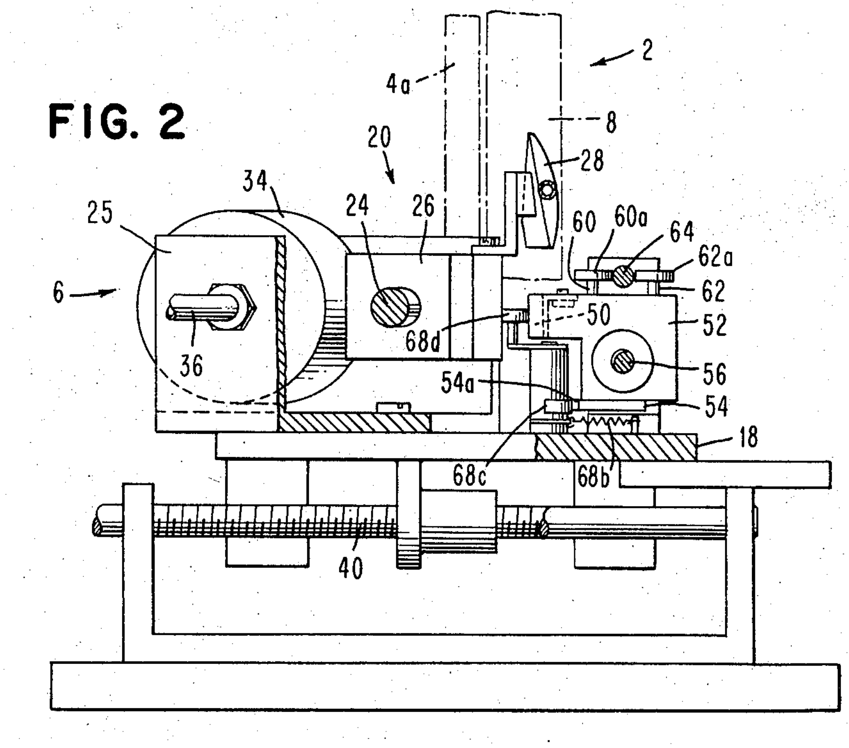

As viewed in FIG. 1, the head assembly is in a fully retracted or home position relative to the discs and carrier 54 is so positioned relative to blade 28 that in the absence of bending constraints on arm 50 movement of head 48 towards a work space formed by the blade would be obstructed by several thicknesses of discs in the undeflected segment (the segment above the blade as viewed in FIG. 1 or to the left of the blade as viewed in FIG. 2). However in the home position of carrier 54 (left in FIG. 10) bell crank assembly 68 (FIGS. 2, 10), rotatable about post 68a fixed to carriage 18, is held in an extreme clockwise rotational orientation by action of the flat portion of cammed surface 54*a* against bell crank roller 68*c*. Arm 50 is thereby bent (downwardly in FIG. 10) by bell crank roller 68*d* to a position of clearance relative to the undeflected discs which are not engaged by blade 28 (i.e., the upper segment of discs as viewed in FIG. 10). On the other hand when carrier 54 is translated towards the disc work space (i.e., to the right in FIG. 10) the inclined portion of cam surface 54*a* comes under roller 68*c* enabling the bell crank assembly to rotate (counterclockwise as viewed in FIG. 10) under the influence of spring 68*b*. This rotates roller 68*d*, disengaging it from interfering contact with arm 50, enabling head 48 (which at this stage of movement of carrier 54 is inside the disc work space formed by blade 28), to pivot toward the nearest undeflected (i.e., object) disc. With predetermined tension on arm 50, adjustably turned as described below, the head assumes compliant air lubricated guiding relation to the object disc forming a distinctive concave dimple in the object disc, at its rotational interface with the head, with the shape of the dimple generally complementing the convex contours of the head (dimple depth exceeds a disc thickness).

Figures 10, 12:
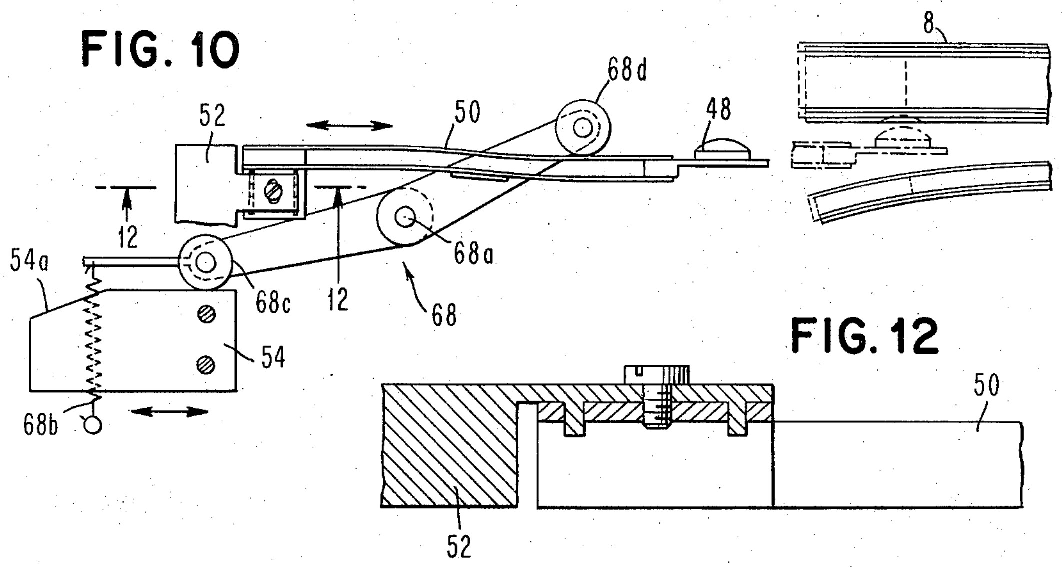
FIG. 10 illustrates the head suspension and loading assembly.
FIGS. 12 and 13 illustrate head to disc tensioning adjustment for practising the invention.
Figure 11:
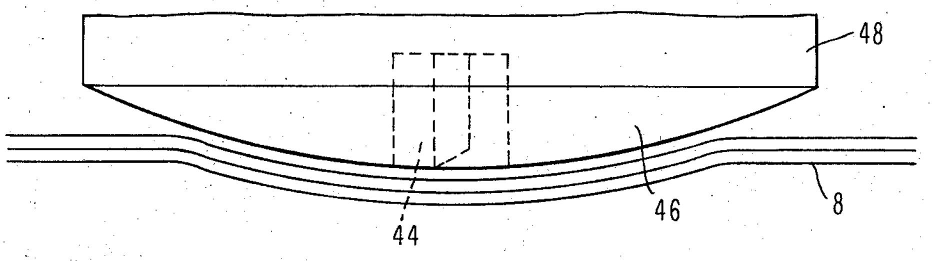
FIG. 11 illustrates the compliant configuration formed between the head and discs.
Figure 13:
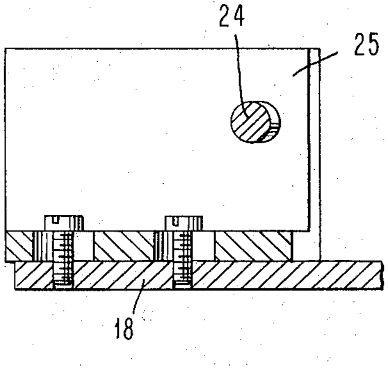

Head Tension Adjustment (FIGS. 12, 13)

Referring to FIGS. 12 and 13 two different methods of adjusting head tension are indicated. FIG. 12 indicates adjustment of the position of head suspension arm 50 relative to carrier 54 and connecting piece 52; and FIG. 13 comprising a sectional view taken along lines 13—13 in FIG. 1 illustrates adjustment of the position of splitter blade chassis 25 relative to carriage 18 (by means of the indicated fastening screws extending through channel openings in chassis 25 to mating threads in carriage 18). Quite clearly as the position of blade chassis 25 is shifted relative to carriage 18 the interface accessed by the blade is correspondingly shifted relative to the head carrier 54 and the head, with corresponding variation in the tension exerted between the head and object disc.

By the same token, if arm 50 is shifted relative to carrier 54 (FIG. 12) and the blade adjustment is left invariant the same effect of variation in tension between the head and object disc surface is achieved.

Operation of Apparatus

In operation, the tension on the head may be adjusted to a finely turned state by connecting the output of the strain gauge (FIG. 10) which monitors the tension on arm 50 to an oscilloscope, positioning the head relative to a test object disc in the nominal center of the pack (this disc may be one which is not used for recording) and adjusting the tension (via the mechanism indicated in either FIG. 12 or FIG. 13) while monitoring recorded signal patterns until a condition of maximal recording efficiency consistent with minimal abrasional stress on the disc is reached. In the illustrated configuration, with 12 inch diameter oxide coated mylar discs 1.7 mils thick rotating at 1,800 rpm the finely tuned head is found to be able to operate in flying relationship to all but the 25 discs closest to end plate 4*a* with a single tension tuning adjustment. In the illustrated apparatus a tension force of 20 grams was found to be suitable as a fine tuning condition on a head having compound radius contours: a three-eighths inch diameter button with 3 inch spherical radius at gap center for a diameter of three-sixteenths inch merging to a section of 1 inch spherical radius; on an arm 3½ inches in length made of spring steel.

Alternate Head Configuration For Reading On Deflected Pack

Figure 14:
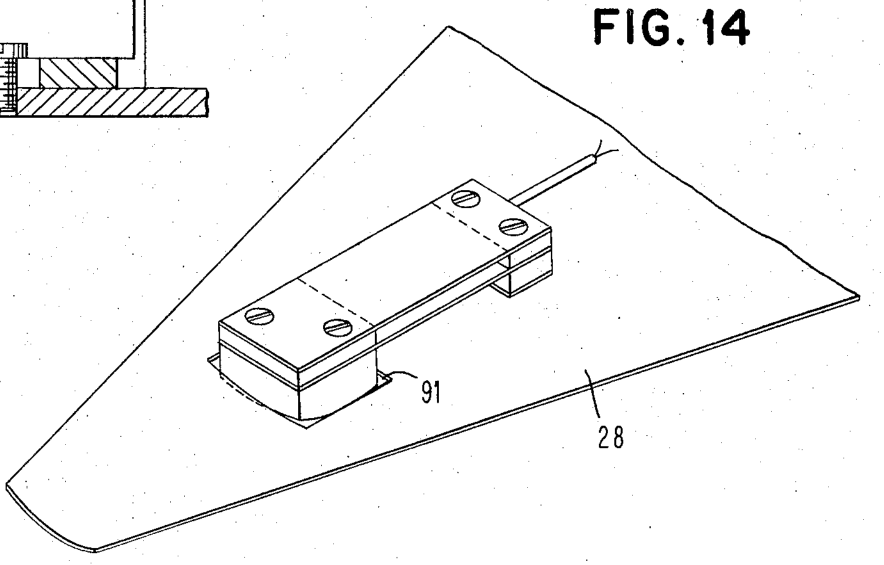
FIG. 14 illustrates an adjustably tensioned head resiliently mounted on the partitioning blade and operable through an opening in the blade.

As indicated in FIG. 14, the transducer may be suspended resiliently from the blade 28 and operate through an opening 91 in the blade adjacent object discs displaced by the blade. The tension is adjusted by means of shims inserted between the end of the head suspension arm and the blade mounting surface. With appropriately tuned tension adjustment, the indicated configuration of discs rotating at 1800 rpm will provide for flying and compliant relationship between the head and all but the 50 object discs nearest the unrestrained end of the disc cylinder, with satisfactory recorded signal quality.

While the invention has been particularly shown and described with reference to a preferred embodiment thereof it will be understood by those skilled in the art that various changes in form and detail may be made therein without departing from the spirit and scope of the invention.

What is claimed is:

1. In an assembly of multiple laminarly arranged flexible magnetic storage discs co-rotating in a cylindrical configuration, wherein stable work spaces are formed at random disc interfaces to render object disc surfaces at said interfaces accessible for transducing access, improved transducing apparatus comprising:

a resiliently suspended head mounted to be maneuverable in said work spaces adjacent said object disc surfaces; said head having selected contour and resilient tensioning relative to said discs such that said object disc is caused to trace a rotational path having a dimple therein which is distinctively contoured to a shape complementing the head contour at the area of rotational interface with said head and which is separated from said head by a hydrodynamically formed air film.

2. Transducing apparatus according to claim 1 wherein the object discs are rendered accessible by means deflecting a random-sized segment of discs away from the object disc leaving the object disc and all other discs not in said segment in undisturbed rotational orbits, and said head is maneuvered adjacent said object disc with selectively determined tension.

3. Transducing apparatus according to claim 1 wherein the discs are rendered accessible by means deflecting a random-sized segment of discs bounded by and containing the object disc, away from the complementary segment formed by all other discs and the head is maneuvered adjacent said object disc with selectively determined tension.

4. Apparatus according to claim 1 wherein said discs are substantially completely contiguous at all interfaces except the interface at which said work space is formed and wherein the disc interfacing said work space are partially separated and partially contiguous.

* * * * *